(12) United States Patent
Jagota et al.

(10) Patent No.: US 11,010,771 B2
(45) Date of Patent: May 18, 2021

(54) MACHINE LEARNING FROM DATA STEWARD FEEDBACK FOR DATA MATCHING

(71) Applicant: salesforce.com, inc., San Francisco, CA (US)

(72) Inventors: Arun Kumar Jagota, Sunnyvale, CA (US); Piranavan Selvanandan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 154 days.

(21) Appl. No.: 16/263,313

(22) Filed: Jan. 31, 2019

(65) Prior Publication Data

US 2020/0250687 A1    Aug. 6, 2020

(51) Int. Cl.
  *G06Q 30/02*    (2012.01)
  *G06N 20/00*    (2019.01)
  *G06F 16/28*    (2019.01)
  *G06K 9/62*     (2006.01)

(52) U.S. Cl.
  CPC ....... *G06Q 30/0201* (2013.01); *G06F 16/285* (2019.01); *G06K 9/6215* (2013.01); *G06N 20/00* (2019.01)

(58) Field of Classification Search
  CPC ........... G06Q 10/00–50/00; G06F 1/00–40/00; G06N 3/00–20/00
  See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |

(Continued)

OTHER PUBLICATIONS

Ehrig, Marc. Measuring Similarity between Semantic Business Process Models, 2007, Institute of Applied Informatics and Formal Description Methods Karlsruhe Institute of Technology.*

*Primary Examiner* — Arif Ullah
(74) *Attorney, Agent, or Firm* — Dergosits & Noah LLP; Todd A. Noah

(57) ABSTRACT

A system determines factored score by multiplying factor and match score for values of field in two records, offset score by adding offset to factored score, and weighted score by applying weight to offset score. The system determines status for two records based on combining weighted score with other weighted score corresponding to other field of two records. The system revises factor, offset, and weight based on feedback associated with two records. The system determines revised factored score by multiplying revised factor and match score for other values of field in two other records, revised offset score by adding revised offset to revised factored score, and revised weighted score by applying revised weight to revised offset score. The system determines learned status for two other records based on combining revised weighted score with additional weighted score corresponding to other field for two other records.

20 Claims, 4 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,930,413 B2 * | 1/2015 | Tang .............. G06F 16/211 707/803 |
| 8,972,336 B2 * | 3/2015 | Jagota ............. G06Q 30/02 707/602 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

* cited by examiner ns may miss a match between a record that stores the name Jonathan Smith and another record that stores the misspelled name Jontahon Smith. In another example, a database system may erroneously identify a match between a record that stores the name Erica Jones and another record that stores the lexically similar name Eric Jones. A clustering process may group records of different people, such as John Smith and Jonathan Smith, into a master profile for one person. Such problems are exacerbated when a database system processes international data. For these reasons, data stewards often closely monitor the accuracy of the matching, clustering, and merging processes, and override their decisions when appropriate. A data steward can be a role within an organization, which is responsible for ensuring the fitness of the organization's information elements.

MACHINE LEARNING FROM DATA STEWARD FEEDBACK FOR DATA MATCHING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data may become extremely complex and dynamic due to the many changes that individual customers go through over time. For example, a company's purchasing agent can change her family name upon marriage, change her email address, change her phone number, and change her employer within a relatively short period of time. In another example, a customer who is known by the name Robert can also use Rob, Robby, Bob, and Bobby as his given name. The use of customer data may create additional challenges, such as due to invalid email addresses, invalid phone numbers, invalid street addresses, names spelled wrong, incorrect employer information, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the customer data from interactions conducted by the company's marketing, retail, and customer service departments. This customer data may be distributed for storage by different cloud storage providers, and/or these company departments may be organized as different tenants in a multi-tenant database.

A traditional approach to resolving these challenges is through the instantiation of a database system that functions as a master data management hub which stages, profiles, cleanses, enriches, matches, reconciles, and instantiates all customer related records to create a single master profile for each customer, and then provides access to these master profiles and their cross references to business applications. The database system can use the generated master profiles to assist in responding to customer requests. For example, a customer makes a purchase via a company's retail cloud instance, and the customer enters some identifying information when filing a service request with the company's customer service cloud instance. The database system responds by automatically finding all that is known about this customer in their master profile, especially in the purchase record(s) of the relevant item, so as to enable the company's customer service department to process the service request more effectively.

Since customer data processing is complex, errors may occur. For example, a database system may miss a match between a record that stores the name Jonathan Smith and another record that stores the misspelled name Jontahon Smith. In another example, a database system may erroneously identify a match between a record that stores the name Erica Jones and another record that stores the lexically similar name Eric Jones. A clustering process may group records of different people, such as John Smith and Jonathan Smith, into a master profile for one person. Such problems are exacerbated when a database system processes international data. For these reasons, data stewards often closely monitor the accuracy of the matching, clustering, and merging processes, and override their decisions when appropriate. A data steward can be a role within an organization, which is responsible for ensuring the fitness of the organization's information elements.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
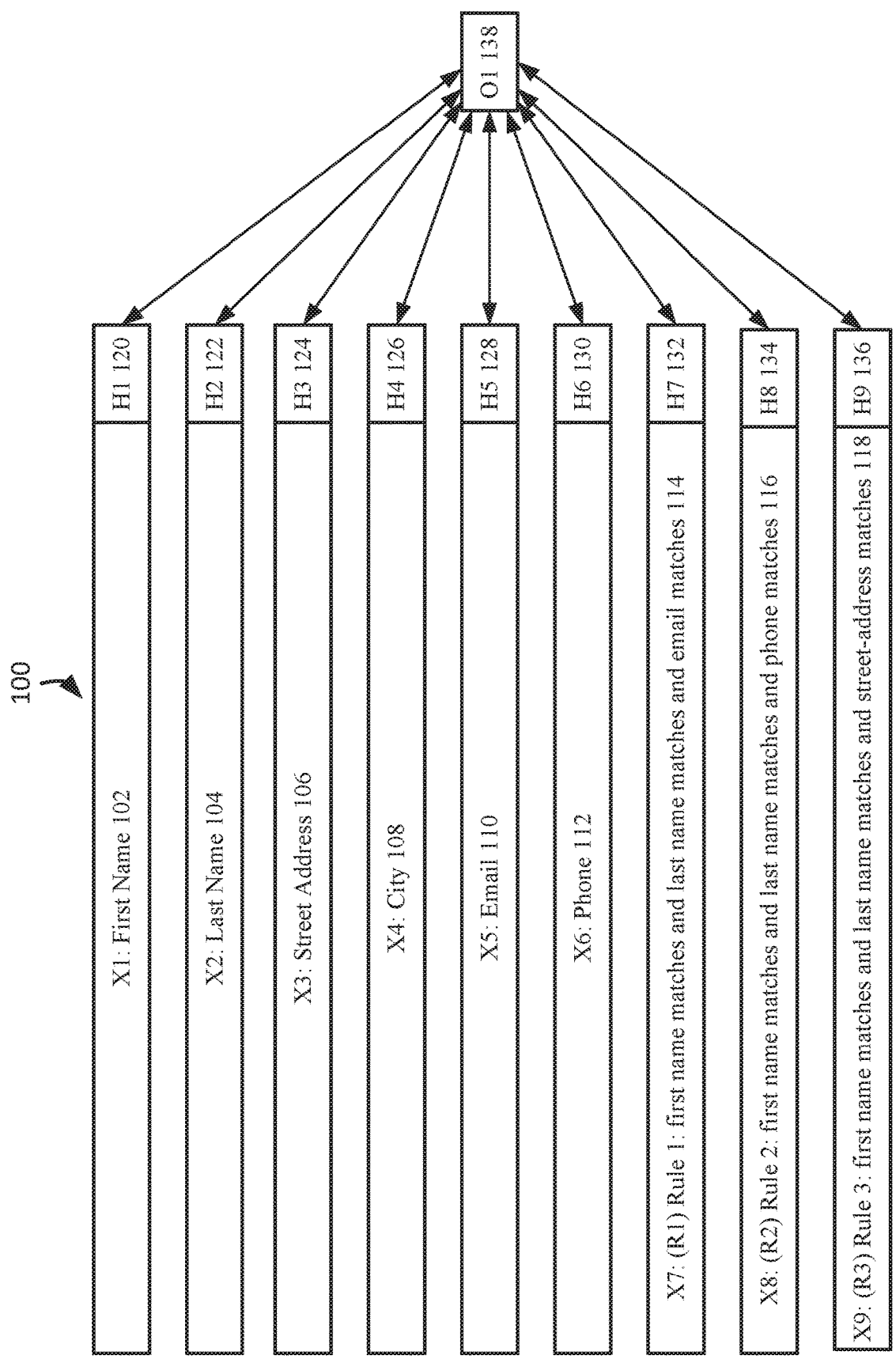
FIG. 1 illustrates example data structures used for machine learning from data steward feedback for data matching, in an embodiment.

In accordance with embodiments described herein, there are provided methods and systems for machine learning from data steward feedback for data matching. A system determines a factored score by multiplying a factor and a match score for values of a field in two records, an offset score by adding an offset to the factored score, and a weighted score by applying a weight to the offset score. The system determines a status for the two records based on combining the weighted score with another weighted score corresponding to another field of the two records. The system revises the factor, the offset, and the weight based on feedback associated with the two records. The system determines a revised factored score by multiplying the revised factor and a match score for other values of the field in two other records, a revised offset score by adding the revised offset to the revised factored score, and a revised weighted score by applying the revised weight to the revised offset score. The system determines a learned status for the two other records based on combining the revised weighted score with an additional weighted score corresponding to the other field for the two other records.

For example, a customer resolution engine determines whether a first record that stores John Smith/San Francisco/ 1-987-654-3210 matches a second record that stores J. Smith/South San Francisco/jsmith@acme.com by multiplying a sigmoidal gain of 0.80 for the first name by a match score of 0.80 for the first name to result in a product of 0.64 for the first name. Next, the customer resolution engine subtracts the bias of 0.40 for the first name from the product of 0.64 for the first name to result in the adjusted value of 0.24 for first name, which is transformed by a sigmoidal function for the first name to result in the normalized value of 0.56 for first name. Then the customer resolution engine applies the weight of 0.50 for the first name to the normalized value of 0.56 for the first name to result in the weighted value of 0.28 for the first name. Finally, the customer resolution engine combines the weighted value of 0.28 for the first name, the weighted value of 0.39 for the last name, and the weighted value of 0.32 for the city to result in a combined value of 0.99, which is transformed by a sigmoidal function for the records to result in the normalized value of 0.75 for the records. Since the normalized value of 0.75 for the records meets the matching threshold of 0.75, the customer resolution engine determines that the first record which stores John Smith/San Francisco/1-987-654-3210 matches the second record which stores J. Smith/South San Francisco/jsmith@acme.com.

The machine learning framework receives feedback from a data steward that specifies that these two records do not match, assigns some of the responsibility for the records not matching to the first names not matching and some of the responsibility for the records not matching to the cities not matching. The machine learning framework responds to the data steward's feedback by revising the factors, the offsets, and the weights for the first name and the city.

Then the customer resolution engine determines whether a third record that stores J. Smith/San Francisco/1-987-654-3210 matches a fourth record that stores Jonathan Smith/South San Francisco/jonsmith@mega.com by multiplying a revised sigmoidal gain of 0.75 for the first name by a match score of 0.80 for the first name to result in a revised product of 0.60 for the first name. Next, the customer resolution engine subtracts the revised bias of 0.45 for the first name from the revised product of 0.60 for the first name to result in the revised adjusted value of 0.15 for first name, which is transformed by the sigmoidal function for the first name to result in the revised normalized value of 0.54 for first name. Then the customer resolution engine applies the revised weight of 0.45 for the first name to the revised normalized value of 0.54 for the first name to result in the revised weighted value of 0.24 for the first name. The customer resolution engine combines the revised weighted value of 0.24 for the first name, the weighted value of 0.39 for the last name, and the revised weighted value of 0.28 for the city to result in a revised combined value of 0.91 which is transformed by the sigmoidal function for the records to result in the normalized value of 0.73 for the third and fourth records. Since the normalized value of 0.73 for the third and fourth records is less than the matching threshold of 0.75, the customer resolution engine determines that the third record which stores J. Smith/San Francisco/1-987-654-3210 does not matches the fourth record which stores Jonathan Smith/South San Francisco/jonsmith@mega.com. If the machine learning framework had not responded to the data steward's feedback by revising the factors, the offsets, and the weights for the first name and the city, then the customer resolution engine would have erroneously determined that the third record matches the fourth record.

Systems and methods are provided for machine learning from data steward feedback for data matching. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a data structure for machine learning from data steward feedback for data matching. Next, methods and systems for machine learning from data steward feedback for data matching will be described with reference to example embodiments.

While one or more implementations and techniques are described with reference to an embodiment in which machine learning from data steward feedback for data matching is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

To effectively leverage feedback from data stewards, the feedback needs to be expressed suitably. For example, if a data steward determines that a customer resolution engine has clustered records for Erica Jones and Eric Jones in the same master profile, the data steward identifies the mismatched field first_name, identifies the mismatched fields' values Erica and Erica, and labels the record match as a false match. The data steward provides an insight in going from the false match of two records to attributing this false match to a false match of two values in particular fields of the two records. This sort of attribution of false matches of records to particular fields in the records is generally difficult for a machine learning framework to determine on its own.

If a data steward cannot determine with certainty which field match led to a false match, the data steward can assign a probability to each of the records' fields based on the likelihood that a field is responsible for the false match. These probabilities, even if crude in any one instance, when accumulated over many instances can start guiding machine learning effectively. If a customer resolution engine misses a match between a record that stores the name Jonathan Smith and another record that stores the misspelled name Jonathon Smith, a data steward can collect common misspellings of the name Jonathan, such as Jonathon, Joanathan, and Jonothan, and then provide these misspellings to the machine learning framework in the form of positive instances of matches to the name Jonathan.

A data steward may determine that a customer resolution engine matched two records and conclude, possibly assisted by additional information, that there is insufficient evidence for these two records to match. For example, the two records store:

| first_name | last_name | address | city |
|---|---|---|---|
| john | smith | 1 Market St, | San Francisco |
| John | Smith | 100 Main St. | South San Francisco. |

The data steward can create a training set instance: ((fn=john, ln=smith, address=1 Market St, city=San Francisco), (fn=John, ln=Smith, address=100 Main St, city=South San Francisco), 0 [false match]).

The data steward might optionally attach probabilities (or weights) on the various fields for their likelihood of having contributed to the false match. Continuing the example, the data steward assigns the following weights:
(fn-weight=0, ln-weight=0, address-weight=0.75, city-weight=0.25).

The machine learning framework can create additional field-level instances to leverage this additional information, such as:
field_name: address training instance: (1 Market St, 100 Main St, 0) training instance weight: 0.75;
field_name: city training instance: (San Francisco, South San Francisco, 0) training instance weight: 0.25.

A customer can reveal to a data steward that a certain expected record match is not occurring as expected by the customer. For example, the following two records should have matched:

| first_name | last_name | address | city |
|---|---|---|---|
| john | smith | 1 Market St, | S San Francisco |
| Johnny | Smith | 2 Market St, | South San Francisco. |

The data steward can create a record-level positive training instance
((fn=john, ln=smith, address=1 Market St, city=S San Francisco), (fn=Johnny, ln=Smith, address=2 Market St, city=South San Francisco), 1 [missed match])

The data steward can optionally attach probabilities (or weights) on the various fields for their likelihood of having contributed to the missed match. Continuing the example, the data steward assigns the following weights:
(fn-weight=0.33, ln-weight=0, address-weight=0.33, city-weight=0.33).

From these weights, the machine learning framework can create additional field-level instances to leverage this additional information, such as:
field_name: first_name training instance: (john, Johnny,1) training instance weight: 0.33,
field_name: address training instance: (1 Market St, 2 Market St, 1) training instance weight: 0.33,
field_name: city training instance: (S San Francisco, South San Francisco,1) training instance weight: 0.33.

A data steward may determine that a customer resolution engine created two separate clusters of records that are the basis for two separate master profiles, and that these clusters of records should be combined into one cluster of records that is the basis for one master profile. For example:
Profile 1

| first_name | last_name | address | city |
|---|---|---|---|
| John | Smith | 1 Market | San Francisco |
| Johnny | Smith | 1 Market St | San Francisco |

Profile 2

| first_name | last_name | address | city |
|---|---|---|---|
| John | Smith | 1 Mrket St | San Francisco |
| Johnny | Smith | 1 Mrkt St | San Francisco |

Upon this discovery, the data steward can recommend merging these two clusters of records for two master profiles into one cluster of records for one master profile. The machine learning framework can respond by creating four training set instances—one for each combination of one record from Profile 1 and one record from Profile 2. A positive instance specifies two records and asserts that they should match.

| | | | |
|---|---|---|---|
| (John | Smith | 1 Market | San Francisco, |
| John | Smith | 1 Mrket St | San Francisco, 1 [positive match]) |
| (Johnny | Smith | 1 Market St | San Francisco, |
| John | Smith | 1 Mrket St | San Francisco, 1 [positive match]) |
| (John | Smith | 1 Market | San Francisco, |
| Johnny | Smith | 1 Mrkt St | San Francisco, 1 [positive match]) |
| (Johnny | Smith | 1 Market St | San Francisco, |
| Johnny | Smith | 1 Mrkt St | San Francisco, 1 [positive match]) |

In addition, the data steward may optionally assign probabilities to the likely fields that contributed to the missed matches. Continuing this example, the data steward assigns the following weights:

| first_name | last_name | address | city |
|---|---|---|---|
| 0 | 0 | 1.0 | 0 |

From these weights, the machine learning framework can create new field-level positive instances, such as: field: address training instances: (1 Market, 1 Mrket St, 1), (1 Market St, 1 Mrket St, 1), (1 Market, 1 Mrkt St, 1), (1 Market St, 1 Mrkt St, 1)

A data steward may determine that a customer resolution engine created a cluster of records which is the basis for a master profile, and then specify that this cluster of records should be split into two separate clusters of records that are the basis for two separate master profiles. For example:
Profile

| first_name | last_name | address | city |
|---|---|---|---|
| John | Smith | 1 Market | San Francisco |
| J | Smith | Market | New York City |
| John | Smith | 1 Market St | San Francisco |

The data steward can remove the second record from this master profile, and then create a new master profile for the removed record. The machine learning framework can respond by creating two negative record-level instances for training:

| (John | Smith | 1 Market | San Francisco, |
|---|---|---|---|
| J | Smith | Market | New York City, 0) |
| (J | Smith | Market | New York City, |
| John | Smith | 1 Market St | San Francisco, 0) |

This training reinforces that in the two mismatching instances the cities are San Francisco and New York City. This takes advantage of the two matching records in the profile both storing the city San Francisco, whereas the one record that was removed from this profile stores the city New York City. Repeated feedback of this type, when aggregated over multiple training instances will enable the machine learning framework to learn that records in such vastly different cities are unlikely to be in the same cluster of records. On the other hand, while in these negative instances J and John also get negatively reinforced as first name matches, there will be other positive feedback in which J and John match. Consequently, the customer resolution engine will not be as definitive in using the mismatch of the first names (J, John) as a predictor of a record-level mismatch.

In addition, the data steward may optionally assign probabilities to the likely fields that contributed to the false matches. In this example, the data steward can assign the following weights:

| first_name | last_name | address | city |
|---|---|---|---|
| 0 | 0 | 0 | 1.0 |

From these, the machine learning framework can create new field-level negative instances, such as field: city training instances (San Francisco, New York. 0), (New York, San Francisco, 0).

The data steward can provide more granular insights into the split to the machine learning framework. For example, the data steward splits the cluster of records {a, b, c, d, e} for a master profile into the cluster of records {a, b, c} and the cluster of records {d, e}. The machine learning framework can respond by displaying the match graph for the cluster of records {a, b, c, d, e} to the data steward. The match graph can reveal which pairs of records in the cluster of {a, b, c, d, e} were determined to match by the customer resolution engine. The data steward reviews the match graph and identifies the match a-e as the one and only false match responsible for having combined the cluster of records {a, b, c} and the cluster of records {d, e} in the same cluster of records {a, b, c, d, e}. The machine learning framework can respond by creating just one negative instance a-e. Furthermore, the data steward can review the records a and e of the negative instance a-e, identify that the record a stores the name Erica Jones and that the record e stores the name Eric Jones, and identify the mismatched field first_name. The machine learning framework can respond by creating a negative instance on the first name field for (Erica, Eric). A single record incorrectly placed in a cluster of records is a special case of this scenario.

The match of two records does not require a match on all fields in the two records. The records may match in their first name, last name, and street address, but mismatch in their email address, because one email may be a personal email while the other email may be a business email. Therefore, sufficient evidence may exist for a record-level match despite the email mismatch. In contrast, a field-combination level match, which may be referred to as a match rule, requires a match on all fields in a combination of fields. An example of a match rule is first name matches and last name matches and phone matches. The notion of field-level combinations is also useful for composite fields such as address= (street, city, zip, state, country). The reason for distinguishing between record-level matches and field-combination level matches is that the machine learning framework can take advantage of the additional requirement that field-combination level matches imposes. Indeed, if a database system stores domain knowledge that enables deriving a rule-based matching system, this domain knowledge may be provided to machine learning framework by creating a corresponding field-level combination. This allows a machine learning framework to leverage this additional knowledge to improve its accuracy. From the knowledge of which fields compose a certain field-level combination, the machine learning framework can automatically extract features that are composed from features on the individual fields, thereby capturing interactions which increase its accuracy.

As a simple example, John matching John, or Smith matching Smith, or San Francisco matching San Francisco are by themselves weak evidence for a record level match for a person. However, if all three of these three fields match, then the evidence becomes stronger that their records match, and the evidence becomes even stronger if the phone number matches as well. Therefore, the machine learning framework effectively can create a new composite field for each field-level combination. For example, a person record has 6 fields: first name, last name, street-address, city, email, phone. FIG. 1 depicts 6 input neurons, one input neuron for each of the 6 fields. Input neuron $x_1$ corresponds to the first name field 102, input neuron $x_2$ corresponds to the last name field 104, input neuron $x_3$ corresponds to the street address field 106, input neuron $x_4$ corresponds to the city field 108, input neuron $x_5$ corresponds to the email field 110, and input neuron $x_6$ corresponds to the phone field 112. The machine learning framework adds three field-level combinations, or three match rules: (R1) Rule 1: first name matches and last name matches and email matches, (R2) Rule 2: first name matches and last name matches and phone matches, and (R3) Rule 3: first name matches and last name matches and street-address matches.

The machine learning framework adds three more input neurons, denoting R1, R2, and R3 respectively, such that the machine learning framework now has 9 inputs: $x_1, x_2, x_3, x_4, x_5, x_6, x_7, x_8, x_9$, where $x_7, x_8, x_9$ correspond to R1, R2, R3. Input neuron $x_7$ corresponds to (R1) Rule 1: first name matches and last name matches and email matches 114, input neuron $x_8$ corresponds to (R2) Rule 2: first name matches and last name matches and phone matches 116, and input neuron $x_9$ corresponds to (R3) Rule 3: first name matches and last name matches and street-address matches 118. As one instantiation, $x_i = x_{i1} * x_{i2} * \ldots x_{ik}$, where $i_1, i_2, \ldots i_k$ denote the atomic fields of which the composite field i is composed.

Specific matching and clustering feedback units may be abstracted out from the various feedback scenarios described above: feedback units on a pair of records, feedback units on a pair of tuples of values over specific fields, and feedback units on a pair of values of a specific field. A pair of tuples is treated separately from matching a pair of records because a match of a pair of tuples implies that each field in the pair of tuples should match, but such an assumption is not reasonable when matching a pair of records. A data steward labels each type of feedback as either positive (+1) or negative (0 or −1 depending upon system configuration) to capture whether the corresponding values should match or should not match. The data steward assigns a label at the record level for matching a pair or records or a pair of tuples, and at the field level for matching a pair of values. A data steward can also assign a weight as part of a feedback. The weight captures the strength of the data steward's belief that that an instance should have the attached label, such that definite matches or mismatches would have higher weights than ambiguous matches or mismatches. Therefore, matching feedback is at two levels, at the level of scalar values (a pair of field values), and at the level of tuples of values (a pair of record values).

The machine learning framework comprises of field-level matchers, which can be machine-learnt, whose scores are transformed by sigmoid functions. The transformed scores are then fed into an overall record-level score function, which is transformed by another sigmoid function. Examples of fields are first name, last name, phone number, street address, city, postal code, . . . . The system architecture is depicted in FIG. 1, in which all neurons can have a sigmoidal transform function. More formally, given two records U and V, $$S(U,V) = \sigma(\Sigma_i w_i \sigma_i(s_i(u_i, v_i))) \quad \text{Equation 1}$$

Here S(U, V) denotes the overall score of the match of the two records, $s_i$ ($u_i$, $v_i$) denotes the score of the match of the values $u_i$ and $v_i$ in field i of these records, $\sigma_i$ denotes the sigmoid function that approximates a step function on $s_i$ ($u_i$, $v_i$), and $w_i$ denotes the weight with which $s_i$ ($u_i$, $v_i$) contributes to the overall score S(U, V). The i's in $s_i$ and $\sigma_i$ are there as reminders that the field-level score function and sigmoid depend on the field i. That is, different fields can have different scoring functions and different sigmoid functions. σ denotes the sigmoid function at the record-level scoring. This function squashes its input into the range 0 to 1, (or the range −1 to 1, depending on system configuration) resulting in an overall match score that is normalized. The sigmoid functions' gains and offset parameters are suppressed in Equation 1 to simplify notation.

While all individual field-level matchers that compute $s_i$ ($u_i$, $v_i$) for the various fields i employ machine learning, each of these matchers learn differently. First, different fields will have different training sets, such as pairs of instances (first names, phone numbers, etc) that should match or should not match. Second, different fields have different types of matching scenarios. These differing scenarios are isolated into field-specific feature engineering that the various machine learning matchers employ.

For record-level training, the learnable parameters are the weights $w_1$, $w_2$, . . . $w_n$ that control the influence of field-level matches to the record-level match score, and the gains and the offsets of the n+1 sigmoid functions that control the location and the steepness of the (soft) decision thresholds. Simplifying the notation of Equation 1 into the more familiar neural network notation, $x_i$ denotes the match score on field i for the given pair of records.

$$S(U,V) = \sigma(\Sigma_i w_i \sigma_i(x_i)) \quad \text{Equation 2}$$

Next, Equation 2 is transformed a little more—into a neural network with hidden layer neurons and sigmoidal neurons. The sigmoid functions themselves will have no learnable parameters. This transformation will enable the use of the well-known backpropagation algorithm for training. The stochastic gradient descent is especially well suited to enable learning incrementally from the feedback of the data stewards. Therefore, Equation 2 may be re-expressed as:

$$S(U,V) = \sigma(w_0 h_0 + \Sigma_i w_i h_i), h_i = \sigma(b_i x_0 + \Theta_i x_i) \quad \text{Equation 3}$$

In Equation 3, the learnable parameters are $w_0$, $w_1$, . . . $w_n$ and $b_i$, $\Theta_i$, i=1, . . . n. The x's are at the input layer, the h's at the hidden layer, and there is a single neuron at the output layer. FIG. 1 depicts the hidden layer neurons $h_1$ 120, $h_2$ 122, $h_3$ 124, $h_4$ 126, $h_5$ 128, $h_6$ 130, $h_7$ 132, $h_8$ 134, and $h_9$ 136, which correspond to the input neurons $x_1$ 102, $x_2$ 104, $x_3$ 106, $x_4$ 108, $x_5$ 110, $x_6$ 112, $x_7$ 114, $x_8$ 116, and $x_9$ 118, and which are connected to the output neuron 1 138. All neurons can have fixed sigmoidal activation functions. In this setting $x_0$ and $h_0$ are both always kept frozen to −1. In going from Equation 1 to Equation 3, the learnings of the sigmoidal gains are absorbed into the learnings of the weights [$\sigma_\mu$(WX)=$\sigma(\mu WX)$] and the learnings of the sigmoidal offsets create extra dimensions whose values are frozen to −1.

In Equation 3, the influence that a match on field i has on a record-level match may be estimated by rippling the value $x_i$ up the network. First, $x_i$ is multiplied by $\Theta_i$. So as an extreme example, if $\Theta_i$, were zero, the value of $x_i$ would have no influence. Second, $h_i$, the normalized version of $x_i$ is multiplied by $w_i$. Therefore, $w_i$ controls the relative influence of $h_i$ on the overall match score.

This scheme lends itself to multi-level training. In particular, to train on labeled instances at the level of (possibly composite) field i, the system only trains $h_i$ from $x_i$. The instances are of the form ($x_i$, $h_i$) where $h_i$ is −1 or 0 denoting a field-level mismatch or 1 denoting a field-level match. Record-level training on the other hand mostly affects the weights $w_i$ from the hidden layer neurons $h_i$ to the output neuron. Via back-propagation this feedback may be rippled down to adjust $b_i$ and $\Theta_i$, as well. Here also effectively the parameters from the input neuron $x_i$ to the hidden layer neuron $h_i$ are being trained independently for each i.

For field-level training, the feedback takes the form of two values u and v of a certain field and whether they should match or not match at the field level. For a certain fixed i, the machine learning framework has ($x_i$, $h_i$), where $h_i \in \{0, 1\}$ is the target for $x_i$. This feedback is useful for tuning $b_i$ and $\Theta_i$.

A data steward can tag a feedback unit with "ignore for training," which provides the data steward with finer control, because not every action that the data steward takes should trigger machine learning. For example, the customer resolution engine missed a match between a record that stores Erica Jones' maiden name Brown and a record that stores Erica Jones' married name Jones. The data steward may match these two records based on feedback from a customer service representative who interacted with Erica Jones, but the customer resolution engine should not learn that the family name Brown is a match for the family name Jones.

The matching-based machine learning models may be trained at a global level, such as on an individual organization, across all organizations, or a combination of on an individual organization and across all organizations. This combination is analogous to a two-level class hierarchy, in which the common elements are in the root class, and the particular deviations in the subclasses of the root class. The deviations may involve new elements (new fields, such as custom fields) or involve overriding root class behavior in particular subclass scenarios. The machine learning analog of overriding root class behavior by subclass behavior is for trusting an individual organization model over the global model in certain scenarios.

Assuming that feedback arrives abundantly, the following is expected. When the two city values are identical (such as when both are San Francisco), sometimes the person records will match and sometimes the person records will not match. These matching results will teach the machine learning framework that a match on city alone is insignificant. This will get expressed in a relatively low value of $h_{city}$, even when there is a city match. When the two cities are different, especially geographically wide apart (such as San Francisco and New York City) the city mismatch will tend to strongly predict a record-level mismatch. The machine learning framework will learn this lesson in the form of a suitably high $b_{city}$.

For example, the machine learning framework learns $b_i=0.80$ and $\Theta_i=0.90$ for the city field. The bias value is interpreted as saying that any match on city that scores less than 0.80 (such as 80% similarity of the strings) influences a record-level match negatively, all the way down to negative 0.80. The lowest score occurs when $x_i$ is 0. In this case, the input to the sigmoid function becomes $0.8*(-1)+0=-0.8$. For this interpretation, a in Equation 3 is generalized slightly, allowing it to be the tan h function instead. This is equivalent to replacing $\sigma(b_i\ x_0+\Theta_i x_i)$ in Equation 3 by $2*\sigma(b_i\ x_0+\Theta_i x_i)-1$. When the tan h function's input is negative (as when the input is $-0.8$, which happens when $x_i$ is 0), for interpretability purposes at least, $h_i$ should also be negative. $h_i$ being negative has the interpretation that when $x_i$ is low (here 0), this match score provides negative evidence, which detracts from the overall record-level match score. For example, if two records stored (John Smith, city=missing) and (John Smith, city=missing) then the record-level match score should be higher than if the two records stored (John Smith, city=San Francisco) and (John Smith, city=New York). That is negative evidence on city match detracts from the overall record-level match score. Using tan h to get $h_{city}$ makes this detraction transparent. Therefore, in this example even when the two cities match exactly, such as when $x_{city}$ equals 1, the impact of this fact alone on a record-level match is low at 0.10.

The machine learning framework models field combinations by adding input neurons for each such combination, and then adding corresponding hidden layer neurons. As expected, when the match score $x_i$ of such a field combination is high (close to 1), this strongly predicts a record-level match. Therefore, $h_i$ should be close to 1. When there is not a match on this field-combination, $h_i$ should be close to 0, which does not in of itself imply a record-level mismatch, but just indicates that there is no match on that field combination.

Intuition would suggest that instances of this field combination whose $x_i$ is close to 1 will have $h_i$ close to 1 (if not exactly 1) and if not then $h_i$ should be close to 0. Qualitatively this implies that $\Theta_i$ will be close to 1 and $b_i$ will be close to 0. That is, when there is a match on this field-combination, such as when $h_i$ is close to 1, this should contribute strong positive evidence for a record-level match. By contrast, the default value of $b_i(0)$ works. This is because by design $x_i$ will tend to be either close to 1 or close to 0 because $x_i$ is the product of multiple field-level scores. The particular learned values may matter, for prediction accuracy. On the face of it, this problem of learning to predict $h_i$ from $x_i$ may seem an easy problem, due to focusing on the AND nature of the transfer function. Machine learning is used because this approach is more general (and thereby potentially more accurate) as it can produce fuzzier AND-like behaviors (of which the hard AND is a special case). Said another way, if certain match rules are better predictors than others, these distinctions will show up in the parameters that predict $h_i$ from $x_i$.

The following is an example of a positively labeled record-level instance:

| First_name | last_name | address | city |
|---|---|---|---|
| John | Smith | 1 Market | San Francisco |
| J | Smith | Market | San Francisco |

A data steward is asserting that these two records should match, but the customer resolution engine does not match these records because the overall match score according to Equation 3 is significantly less than 1, such that the machine learning framework needs to learn parameter values that will result in Equation 3's overall match score increasing and becoming closer to 1. For this example, the machine learning framework has configured the match rule R1: first name matches and last name matches and street address matches. For this example, the (including composite) field-level match scores are

| fn_match | ln_match | add_match | city_match | R1_match |
|---|---|---|---|---|
| 0.8 | 1.0 | 0.8 | 1.0 | 0.7 |

The weights from the hidden layer neurons to the output layer neuron that correspond to these are

| fn_weight | ln_weight | add_weight | city_weight | R1_weight | $w_0$ |
|---|---|---|---|---|---|
| 0.9 | 0.9 | 0.9 | 0.5 | 0.3 | 0.2 |

The weight of 0.3 for R1 indicates that the machine learning framework has yet to learn to trust R1 sufficiently.

The effect of the feedback from this missed match will be to increase the first five weights and reduce the last weight, $w_0$. The reason that $w_0$ is reduced is because $h_0$ is $-1$, whereas all the other $h_i$'S are positive. The prospective weight changes for the individual fields may be compared against the prospective weight changes for the field combination R1. For example, $h_{city}$ is already low, as expected, because the machine learning framework has already learned that a match on city in of itself does not predict a record-level match. For this example, $h_{R1}$ is high so that the machine learning framework may be sensitive to a match on match rule R1 even if the machine learning framework has yet to learn to trust R1 sufficiently. The trust for R1 is controlled by $w_{R1}$, while the sensitivity for R1 is controlled by $h_{R1}$. Since $h_{R1}$ is high, the weight $w_{R1}$ will be increased more than the weight $w_{city}$. In effect the machine learning framework is reasoning that increasing $w_{city}$ would not be correct because there is already enough evidence that a match on city alone is insufficient for a record-level match. However, since $h_{R1}$ is high, it is more plausible that $w_{R1}$ is not sufficiently high. Said another way, a unit increase in $w_{R1}$ moves the needle more than a unit increase in $w_{city}$, so it makes sense to increase $w_{R1}$ more. The differing ways the machine learning framework handles $w_{city}$ and $w_{R1}$ may be reasoned as follows. For $w_{city}$, the machine learning framework has already learned through a lot of data that a match on city alone does not predict a record-level (i.e. person-level) match. However, the initial value for $w_{R1}$ is low for a different reason, namely that this is a new rule for which the machine learning framework has not established trust yet. The machine learning framework has already learned to distrust a city match alone, but the machine learning framework is starting off being conservative on $w_{R1}$ only because the machine learning framework has not yet seen the effect of this new rule, such that being more flexible on changing $w_{R1}$ makes more sense.

For a negative example: of a record level match:

| first_name | last_name | address | city |
|---|---|---|---|
| John | Smith | 1 Market | New York |
| J | Smith | 10 Main St | San Francisco |

For this example, the machine learning framework has configured the match rule R1: first name matches and last name matches and street address matches. For this example, the field-level match scores are:

| fn_match | ln_match | add_match | city_match | R1_match |
|---|---|---|---|---|
| 0.8 | 1.0 | 0.2 | 0 | 0.2 |

The weights from the hidden layer neurons to the output layer neuron that correspond to these are:

| fn_weight | ln_weight | add_weight | city_weight | $w_0$ | R1_weight |
|---|---|---|---|---|---|
| 0.5 | 0.5 | 0.5 | 0.5 | 0.2 | 0.9 |

These weights may be interpreted as meaning that by now the machine learning framework has learned that matches on individual fields do not predict a record level match, but that a match on R1 does predict a record level match.

Since the overall match score is high but the data steward assigned a record-level match label of 0, the machine learning framework wants to decrease all weights other than $w_0$ and increase $w_0$. Increasing $w_0$ makes the overall system slightly more conservative. Reasoning as before, since the first_name_match and last_name_match scores are individually high and the overall records still do not match, the machine learning framework learns to rely even less on the individual first and last name matches. This has the result of decreasing the fn_weight and the ln_weight significantly. By contrast, since the R1_match is low, the machine learning framework hardly needs to decrease the R1_weight. This is saying that since the match rule R1 did not even fire on this instance, the match rule R1 could not possibly be responsible for the false match.

The customer resolution engine can cleanse, normalize, and enrich entity data as needed. For example, a traditional match rule for uniquely identifying a person may process the data set that includes "John Smith/1 Main St, San Francisco, Calif. 94105" and "John Smith/11 Main St, San Francisco, Calif. 94105," and identify two unique people. While a traditional match rule can match addresses by using "fuzzy" strings, in isolation this fuzzy matching can lead to false positives, as there could be two different John Smiths at different addresses. In contrast, the customer resolution engine can more intelligently apply matching rules by incorporating customer data reliability into the matching process. For this example, the customer resolution engine captures and leverages data validation and enrichment attributes as part of the record fields to determine that "11 Main St" is not a valid street address for "San Francisco, Calif. 94105," infer a data entry error in the street number, and then identify the nearest string or geo-proximity match as a reliable candidate, thereby identifying only one unique John Smith on Main Street in San Francisco.

The customer resolution engine can use a similar approach in assessing reliability of a record field for uniqueness. For example, a traditional match rule "Name AND (Phone Number OR Email)" would process the data set that includes "John Smith/415-555-1212/john.smith@gmail.com," "John Smith/415-555-1212/john_smith@gmail.com," and "Cary Jones/415-555-1212/cary@joneses.com," and then identify two unique people, John Smith and Cary Jones. In contrast, the customer resolution engine can more intelligently apply matching rules by identifying how many unique source records, names, and email addresses relate to any given phone number, or vice versa. By identifying that a specific phone number is commonly used across many records, where other match condition fields did not match, such as name and email address, the customer resolution engine can apply a matching rule that processes the specific phone number as a shared record field, which is not a unique record field, thereby identifying two unique John Smiths who share the phone number 415-555-1212.

Figure 2:
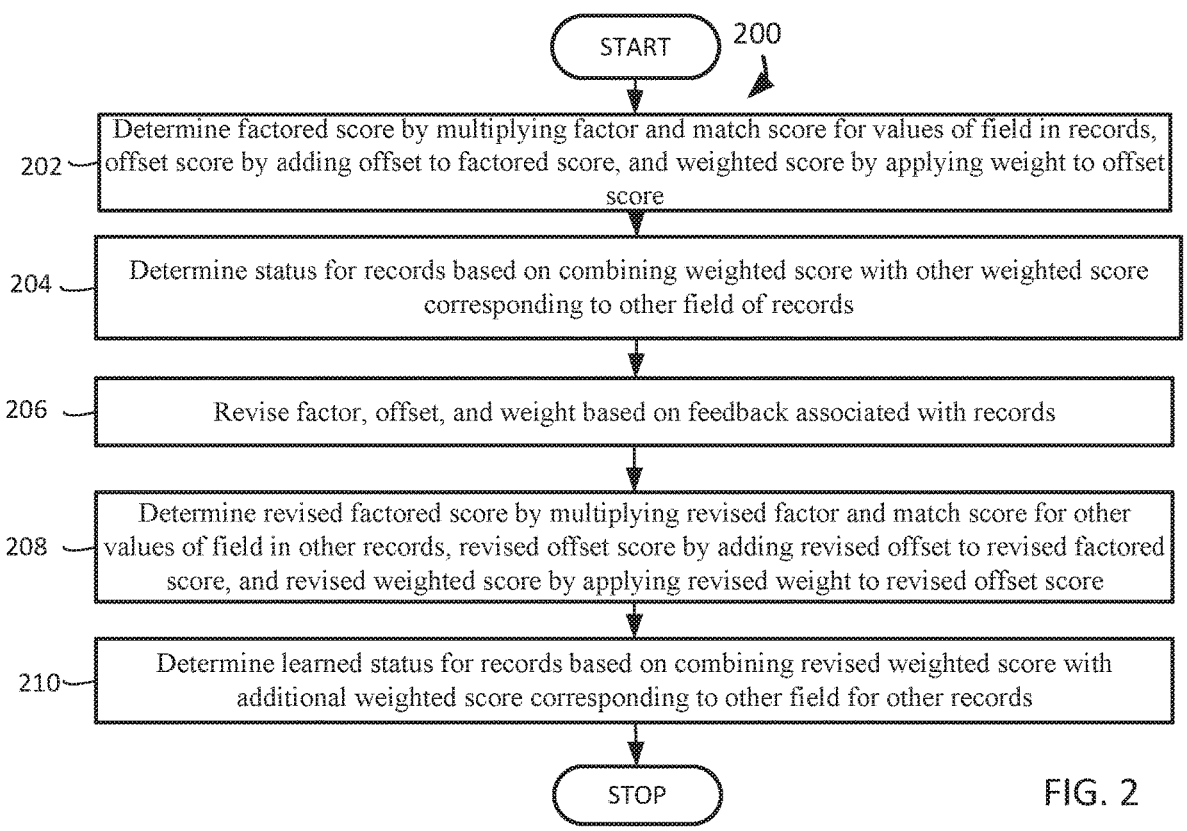
FIG. 2 is an operational flow diagram illustrating a high-level overview of a method for machine learning from data steward feedback for data matching, in an embodiment.

FIG. 2 is an operational flow diagram illustrating a high-level overview of a method 200 for machine learning from data steward feedback for data matching. A factored score is determined by multiplying a factor and a match score for values of a field in two records, an offset score is determined by adding an offset to the factored score, and a weighted score is determined by applying a weight to the offset score, block 202. The customer resolution engine calculates the weighted matching score for record field values. For example, and without limitation, this can include a customer resolution engine determining whether a first record that stores the first name field value John, the last name field value Smith, the city field value San Francisco, and the phone field value 1-987-654-3210 matches a second record that stores the first name field value J., the last name field value Smith, the city field value South San Francisco, and the email field value jsmith@acme.com. First, the customer resolution engine multiplies a sigmoidal gain of 0.80 for the first name by a match score of 0.80 for the first name to result in a product of 0.64 for the first name. In this example, the claimed factor corresponds to the sigmoidal gain, which is represented as $\Theta_i$ in Equation 3, the claimed match score corresponds to the match score, which is represented as $x_i$ in Equation 3, and the claimed factored score corresponds to the product, which is represented as $\Theta_i x_i$ in Equation 3.

A record can be the storage of at least one value in a persistent form. A field can be a part of a record, representing an item of data. A value can be the symbols on which operations are performed by a computer. A match score can be a rating or grade related to a correspondence or similarity between a pair of things. A factor can be a quantity that when multiplied by another quantity produces a number. A factored score can be a rating or grade that has been multiplied by a numerical quantity.

After determining the product for the first name, the customer resolution engine subtracts the bias of 0.40 for the first name from the product of 0.64 for the first name to result in the adjusted value of 0.24 for first name. In this example, the claimed offset corresponds to the bias, which is represented as $b_i$ in Equation 3, and the claimed offset score corresponds to the adjusted value, which is represented by $(b_i x_0 + \Theta_i x_i)$ in Equation 3. An offset can be an amount that diminishes the effect of a contrary amount. An offset score can be a rating or grade that has been diminished by an amount.

Following the determination of the adjusted value for the first name, the customer resolution engine can transform the adjusted value of 0.24 for the first name by applying a sigmoidal function for the first name, which results in the normalized value of 0.56 for first name. In this example, the claimed offset score that is normalized corresponds to the normalized value, which is represented by $\sigma(b_i x_0 + \Theta_i x_i)$ in Equation 3. Normalize can be the application of a function to a value which produces a result within a desired range. This example describes the use of a sigmoidal function to normalize the adjusted value (the claimed offset score), but any suitable logistic function may be used to normalize the adjusted value.

In some embodiments, the use of a sigmoidal function may not be necessary to normalize the adjusted value. For example, if the claimed factor, which corresponds to the sigmoidal gain and is represented as $\Theta_i$ in Equation 3, ranges from 0 to positive 1, and the claimed match score, which corresponds to the match score and is represented as $x_i$ in Equation 3, ranges from 0 to positive 1, then the claimed factored score, which corresponds to the product and is represented as $\Theta_i x_i$ in Equation 3, also ranges from 0 to positive 1. If the claimed offset, which corresponds to the bias and is represented as $b_i$ in Equation 3, ranges from 0 to positive 1, and $x_0$ is frozen at negative –1, then $b_i x_0$ ranges from 0 to negative –1. Consequently, the claimed offset score, which corresponds to the adjusted value and is represented by $(b_i x_0 + \Theta_i x_1)$ in Equation 3, would comprise $b_i x_0$ which ranges from 0 to negative –1 plus $\Theta_i$ which ranges from 0 to positive 1, such that the sum of these elements would range from negative –1 to positive 1. If the sigmoidal function transformed values to a normalized range from negative –1 to positive 1, in this situation the claimed offset score, which corresponds to the adjusted value and is represented by $(b_i x_0 + \Theta_i x_i)$ in Equation 3, would already range from negative –1 to positive 1, such that normalization by a sigmoidal function or any other logistic function may be superfluous and unnecessary.

Having determined the normalized value for the first name, the customer resolution engine applies the weight of 0.50 for the first name to the normalized value of 0.56 for the first name to result in the weighted value of 0.28 for the first name. In this example, the claimed weight corresponds to the weight, which is represented by wi in Equation 3, and the claimed weighted score corresponds to the weighted value, which is represented by $w_i h_i$ in Equation 3. A weight can be a numerical quantity which is used to represent the importance of a thing relative to other things. A weighted score can be a rating or grade that has been multiplied by a numerical quantity.

In a supplemental example, the customer resolution engine determines whether the first record that stores John Smith/San Francisco/1-987-654-3210 matches the second record that stores J. Smith/South San Francisco/jsmith@acme.com by multiplying a sigmoidal gain of 0.90 for the match rule R4 (first name matches and last name matches and city matches) by a match score of 1.0 for the match rule R4 to result in a product of 0.90 for the match rule R4. In this embodiment, a match rule has a match score of 1.0 if every specified field comparison meets a matching threshold of 0.8, and the match rule has a match score of 0.0 if any specified field comparison fails to meet a matching threshold of 0.8. In other embodiments, a match rule has a match score of 1.0 if every specified field comparison meets a matching threshold of 1.0, and the match rule has a match score of 0.0 if any specified field comparison fails to meet a matching threshold of 1.0. Next, the customer resolution engine subtracts the bias of 0.30 for the match rule R4 from the product of 0.90 for the match rule R4 to result in the adjusted value of 0.60 for match rule R4, which is transformed by a sigmoidal function for the match rule R4 to result in the normalized value of 0.65 for the match rule R4. Then the customer resolution engine applies the weight of 0.6 for the match rule R4 to the normalized value of 0.65 for the match rule R4 to result in the weighted value of 0.39 for the match rule R4.

After determining the weighted score for record field values, a status is determined for the two records based on combining the weighted score with another weighted score corresponding to another field of the two records, block 204. The customer resolution engine determines whether records match. By way of example and without limitation, this can include the customer resolution engine combining the weighted value of 0.28 for the first name, the weighted value of 0.39 for the last name, and the weighted value of 0.32 for the city to result in a combined value of 0.99, which is transformed by applying a sigmoidal function for the records, which results in the normalized value of 0.75 for the records. The claimed combined weighted score corresponds to the combined value, which is represented as $(w_0 h_0 + \Sigma_i w_i h_i)$ in Equation 3, and the claimed combined weighted score that is normalized corresponds to the normalized value, which is represented as $\sigma(w_0 h_0 + \Sigma_i w_i h_i)$ in Equation 3. A combination can be a joining of different parts in which the component elements are individually distinct.

Since the normalized value of 0.75 for the records meets the matching threshold of 0.75, the customer resolution engine determines that the first record which stores John Smith/San Francisco/1-987-654-3210 matches the second record which stores J. Smith/South San Francisco/jsmith@acme.com. The status may be a matching status or a non-matching status. For example, rather than the customer resolution engine determining that the first record and the second record match, the customer resolution engine may determine that the first record and the second record do not match. A status can be a state or condition with respect to circumstances. A matching status can be a state of corresponding in some essential respect. A threshold can be the magnitude that must be satisfied for a certain reaction, phenomenon, result, or condition to occur or be manifested.

In the supplemental example, the customer resolution engine combines the weighted value of 0.28 for the first name, the weighted value of 0.39 for the last name, the weighted value of 0.32 for the city, and the weighted value of 0.39 for the match rule R4 to result in a combined value of 1.38, which is transformed by a different sigmoidal function for the records to result in the normalized value of 0.78 for the records. Since the normalized value of 0.78 for the records meets the matching threshold of 0.75, the customer resolution engine determines that the first record which stores John Smith/San Francisco/1-987-654-3210 matches the second record which stores J. Smith/South San Francisco/jsmith@acme.com.

Having determined whether the two records match, the factor, the offset, and the weight are revised based on feedback associated with the two records, block 206. The machine learning framework learns from a data steward's feedback about the records. In embodiments, this can include the machine learning framework receiving feedback from a data steward that specifies that these two records do not match, assigns some of the responsibility for the records not matching to the first names John and J. not matching and some of the responsibility for the records not matching to the cities San Francisco and South San Francisco not matching. The machine learning framework responds to the data steward's feedback by revising the factor for the first name from 0.80 to 0.75, the offset for the first name from 0.40 to 0.45, the weight for the first name from 0.50 to 0.45, the factor for the city from 0.85 to 0.80, the offset for the city from 0.35 to 0.40, and the weight for the city from 0.55 to 0.50. Feedback can be information about a process, which can be used as a basis for improvement. Probability can be the likelihood of something being the case. A revised status can be a changed state or condition with respect to circumstances.

In the supplemental example, the machine learning framework receives feedback from a data steward that specifies that these two records do not match, assigns 0.33 of the responsibility for the records not matching to the first names John and J. not matching, and 0.33 of the responsibility for the records not matching to the cities San Francisco and South San Francisco not matching, and 0.33 of the responsibility for the records not matching to the match rule R4 (first name matches and last name matches and city matches) not matching. The machine learning framework responds to the data steward's feedback by revising the factor for the first name from 0.80 to 0.75, the offset for the first name from 0.40 to 0.45, the weight for the first from 0.50 to 0.45, the factor for the city from 0.85 to 0.80, the offset for the city from 0.35 to 0.40, the weight for the city from 0.55 to 0.50, the factor for the match rule R4 from 0.90 to 0.85, the offset for the match rule R4 from 0.30 to 0.35, and the weight for the match rule R4 from 0.60 to 0.55.

Having learned about matching the two records from feedback, a revised factored score is determined by multiplying the revised factor and another match score for other values of the field in two other records, a revised offset score is determined by adding the revised offset to the revised factored score, and a revised weighted score is determined by applying the revised weight to the revised offset score, block 208. The customer resolution engine calculates the weighted matching score for record field values based on the learning. For example, and without limitation, this can include the customer resolution engine determining whether the third record that stores J. Smith/San Francisco/1-987-654-3210 matches a fourth record that stores Jonathan Smith/South San Francisco/jonsmith@mega.com by multiplying a revised sigmoidal gain of 0.75 for the first name by a match score of 0.75 for the first name to result in a revised product of 0.56 for the first name. Next, the customer resolution engine subtracts the revised bias of 0.45 for the first name from the revised product of 0.56 for the first name to result in the revised adjusted value of 0.11 for first name, which is transformed by applying the sigmoidal function for the first name, which results in the revised normalized value of 0.53 for first name. Then the customer resolution engine applies the revised weight of 0.45 for the first name to the revised normalized value of 0.53 for the first name to result in the revised weighted value of 0.24 for the first name.

A revised factor can be a corrected quantity that when multiplied by another quantity produces a number. A revised factored score can be a rating or grade that has been multiplied by a corrected numerical quantity. A revised offset can be a corrected amount that diminishes the effect of a contrary amount. A revised offset score can be a rating or grade that has been diminished by a corrected amount. A revised weight can be a corrected numerical quantity which is used to represent the importance of a thing relative to other things. A revised weighted score can be a rating or grade that has been multiplied by a corrected numerical quantity.

In the supplemental example, the customer resolution engine determines whether the third record that stores J. Smith/San Francisco/1-987-654-3210 matches the fourth record that stores Jonathan Smith/South San Francisco/jonsmith@mega.com by multiplying a revised sigmoidal gain of 0.85 for the match rule R4 by a match score of 0.0 for the match rule R4 to result in a revised product of 0.0 for the match rule R4. In this embodiment, a match rule has a match score of 1.0 if every specified field comparison meets a matching threshold of 0.8, and the match rule has a match score of 0.0 if any specified field comparison fails to meet a matching threshold of 0.8. Since the first name field has a match score of 0.75, the math rule R4 has a match score of 0. Next, the customer resolution engine subtracts the revised bias of 0.35 for the match rule R4 from the revised product of 0.0 for the match rule R4 to result in the revised adjusted value of negative −0.35 for the match rule R4, which is transformed by applying the sigmoidal function for the match rule R4, which results in the revised normalized value of 0.41 for the match rule R4. Then the customer resolution engine applies the revised weight of 0.55 for the match rule R4 to the revised normalized value of 0.41 for the match rule R4 to result in the revised weighted value of 0.23 for the match rule R4.

After determining the revising weighted score for the other record field values, a learned status is determined for the two other records based on combining the revised weighted score with another weighted score for the other field of the two other records, block 210. The customer resolution engine determines whether records match based on the learning. By way of example and without limitation, this can include the customer resolution engine combining the revised weighted value of 0.24 for the first name, the weighted value of 0.39 for the last name, and the revised weighted value of 0.28 for the city to result in a revised combined value of 0.91 which is transformed by applying the sigmoidal function for the records, which results in the normalized value of 0.73 for the third and fourth records. Since the normalized value of 0.73 for the third and fourth records is less than the matching threshold of 0.75, the customer resolution engine determines that the third record which stores J. Smith/San Francisco/1-987-654-3210 does not matches the fourth record which stores Jonathan Smith/South San Francisco I jonsmith@mega.com. If the machine learning framework had not responded to the data steward's feedback by revising the factors, the offsets, and the weights for the first name and the city, then the customer resolution engine would have erroneously determined that the third record matches the fourth record.

In the supplemental example, the customer resolution engine combines the revised weighted value of 0.24 for the first name, the weighted value of 0.39 for the last name, the revised weighted value of 0.28 for the city, and the revised weight value of 0.23 for the match rule R4 to result in a revised combined value of 1.14 which is transformed by applying the different sigmoidal function for the records, which results in the normalized value of 0.70 for the third and fourth records. Since the normalized value of 0.70 for the third and fourth records is less than the matching threshold of 0.75, the customer resolution engine determines that the third record which stores J. Smith/San Francisco/1-987-654-3210 does not matches the fourth record which stores Jonathan Smith/South San Francisco/jonsmith@mega.com. If the machine learning framework had not responded to the data steward's feedback by revising the factors, the offsets, and the weights for the first name the city, and the match rule R4, then the customer resolution engine would have erroneously determined that the third record matches the fourth record.

The learned status may be a matching status or a non-matching status. For example, rather than the machine learning resulting in a determination that records do not match that previously would have been determined to match, the machine learning may result in a determination that records match that previously would have been determined to not match. A learned status can be a state or condition with respect to circumstances, which is determined based on experience.

The method 200 may be repeated as desired. Although this disclosure describes the blocks 202-210 executing in a particular order, the blocks 202-210 may be executed in a different order. In other implementations, each of the blocks 202-210 may also be executed in combination with other blocks and/or some blocks may be divided into a different set of blocks.

System Overview

Figure 3:
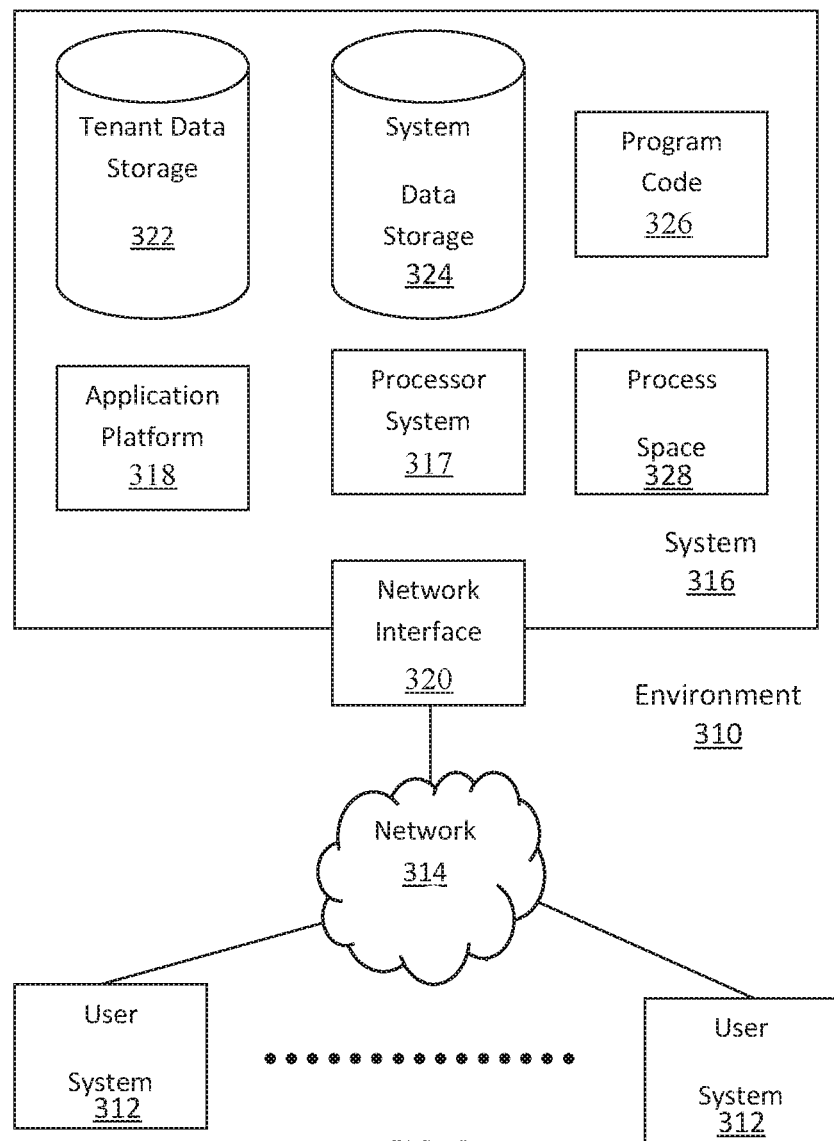
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
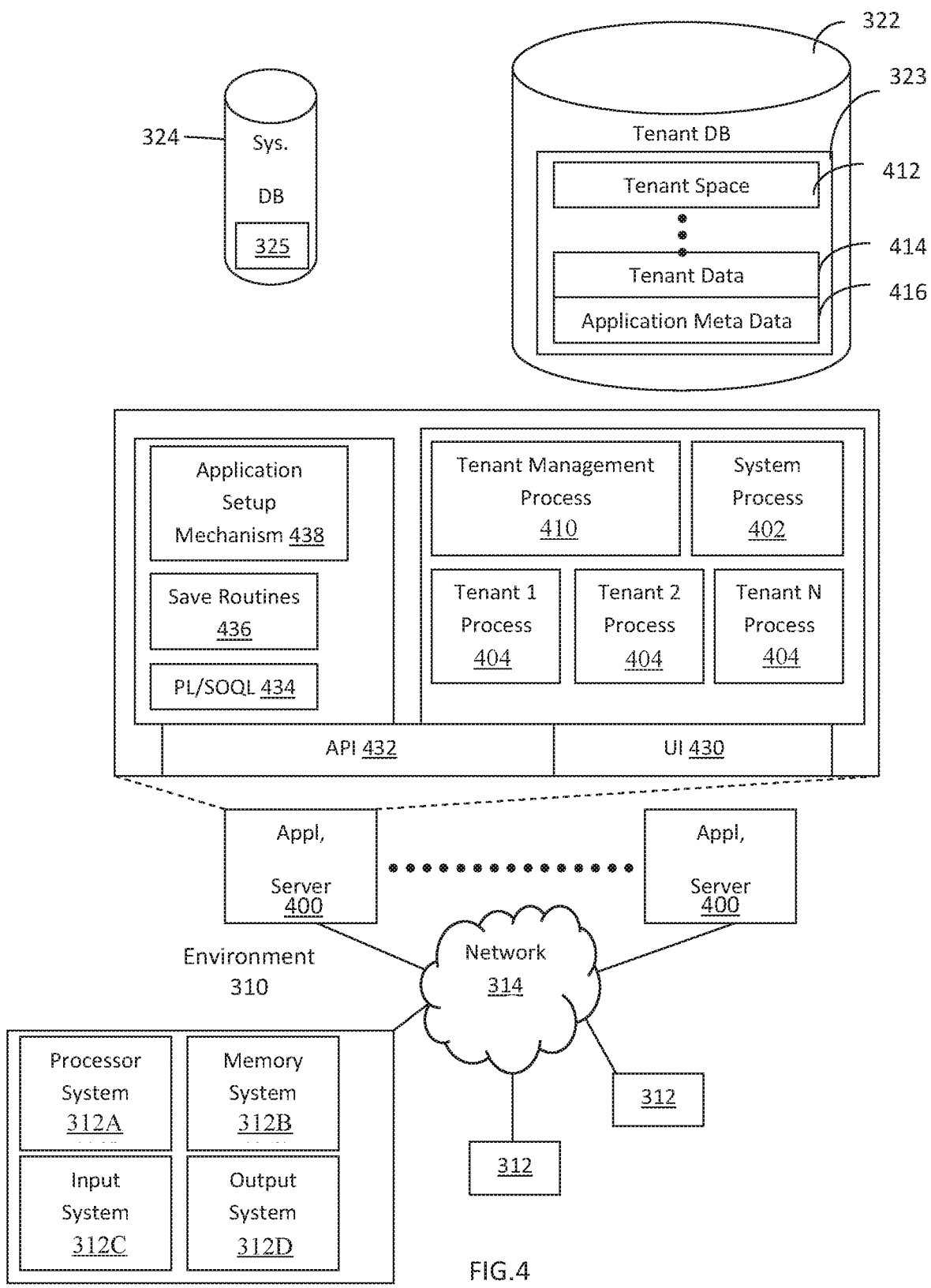
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long-term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
determine a factored score by multiplying a factor and a match score for values of a field in two records, an offset score by adding an offset to the factored score, and a weighted score by applying a weight to the offset score;
determine a status for the two records based on combining the weighted score with another weighted score corresponding to an other field in the two records;
train a machine-learning system to revise the factor, the offset, and the weight by learning from a training set based on feedback associated with the two records and a plurality of feedbacks associated with a plurality of pairs of records;
determine a revised factored score by multiplying the revised factor and another match score for other values of the field in two other records, a revised offset score by adding the revised offset to the revised factored score, and a revised weighted score by applying a revised weight to the revised offset score; and
determine a learned status for the two other records based on combining the revised weighted score with an additional weighted score corresponding to the other field in the two other records.

2. The system of claim 1, wherein determining the offset score comprises normalizing the offset score, and determining the revised offset score comprises normalizing the revised score.

3. The system of claim 1, wherein determining the weighted score comprises normalizing the weighted score, and determining the revised weighted score comprises normalizing the revised weighted score.

4. The system of claim 1, wherein the status comprises one of a matching status and a non-matching status, and the learned status comprises one of the matching status and the non-matching status.

5. The system of claim 1, wherein the feedback is received from a data steward and comprises the values of the field in the two records, the field in the two records, a probability associated with the field, and a revised status.

6. The system of claim 1, wherein the other field in the two records comprises a combination of fields in the two records, and the other field in the two other records comprises the combination of fields in the two other records.

7. The system of claim 1, wherein determining the status for the two records is based on a combination of weighted scores satisfying a threshold, and determining the learned status for the two other records is based on another combination of weighted scores satisfying the threshold.

8. A computer program product comprising computer-readable program code to be executed by one or more processors when retrieved from a non-transitory computer-readable medium, the program code including instructions to:
determine a factored score by multiplying a factor and a match score for values of a field in two records, an offset score by adding an offset to the factored score, and a weighted score by applying a weight to the offset score;

determine a status for the two records based on combining the weighted score with another weighted score corresponding to an other field in the two records;

train a machine-learning system to revise the factor, the offset, and the weight by learning from a training set based on feedback associated with the two records and a plurality of feedbacks associated with a plurality of pairs of records;

determine a revised factored score by multiplying the revised factor and another match score for other values of the field in two other records, a revised offset score by adding the revised offset to the revised factored score, and a revised weighted score by applying a revised weight to the revised offset score; and determine a learned status for the two other records based on combining the revised weighted score with an additional weighted score corresponding to the other field in the two other records.

9. The computer program product of claim 8, wherein determining the offset score comprises normalizing the offset score, and determining the revised offset score comprises normalizing the revised offset score.

10. The computer program product of claim 8, wherein determining the weighted score comprises normalizing the weighted score, and determining the revised weighted score comprises normalizing the revised weighted score.

11. The computer program product of claim 8, wherein the status comprises one of a matching status and a non-matching status, and the learned status comprises one of the matching status and the non-matching status.

12. The computer program product of claim 8, wherein the feedback is received from a data steward and comprises the values of the field in the two records, the field in the two records, a probability associated with the field, and a revised status.

13. The computer program product of claim 8, wherein the other field in the two records comprises a combination of fields in the two records, and the other field in the two other records comprises the combination of fields in the two other records.

14. The computer program product of claim 8, wherein determining the status for the two records is based on a combination of weighted scores satisfying a threshold, and determining the learned status for the two other records is based on another combination of weighted scores satisfying the threshold.

15. A method comprising:

determining a factored score by multiplying a factor and a match score for values of a field in two records, an offset score by adding an offset to the factored score, and a weighted score by applying a weight to the offset score;

determining a status for the two records based on combining the weighted score with another weighted score corresponding to an other field in the two records;

training a machine-learning system to revise the factor, the offset, and the weight by learning from a training set based on feedback associated with the two records and a plurality of feedbacks associated with a plurality of pairs of records;

determining a revised factored score by multiplying the revised factor and another match score for other values of the field in two other records, a revised offset score by adding the revised offset to the revised factored score, and a revised weighted score by applying a revised weight to the revised offset score; and determining a learned status for the two other records based on combining the revised weighted score with an additional weighted score corresponding to the other field in the two other records.

16. The method of claim 15, wherein determining the offset score comprises normalizing the offset score, and determining the revised offset score comprises normalizing the revised offset score.

17. The method of claim 15, wherein determining the weighted score comprises normalizing the weighted score, and determining the revised weighted score comprises normalizing the revised weighted score.

18. The method of claim 15, wherein the status comprises one of a matching status and a non-matching status, and the learned status comprises one of the matching status and the non-matching status.

19. The method of claim 15, wherein the feedback is received from a data steward and comprises the values of the field in the two records, the field in the two records, a probability associated with the field, and a revised status.

20. The method of claim 15, wherein the other field in the two records comprises a combination of fields in the two records, and the other field in the two other records comprises the combination of fields in the two other records.

* * * * *